United States Patent [19]

Tada et al.

[11] 4,188,681

[45] Feb. 19, 1980

[54] SUPPORT STRUCTURE

[75] Inventors: Hiroshi Tada, Yokohama; Toshiro Nozu, Tokyo, both of Japan

[73] Assignee: Oiles Industry Co., Ltd., Tokyo, Japan

[21] Appl. No.: 935,633

[22] Filed: Aug. 21, 1978

[30] Foreign Application Priority Data

| Sep. 17, 1977 [JP] | Japan | 52-111249 |
| Dec. 29, 1977 [JP] | Japan | 52-157913 |
| Dec. 29, 1977 [JP] | Japan | 52-157914 |
| Aug. 29, 1978 [JP] | Japan | 53-103437 |

[51] Int. Cl.² ............................................. E01D 19/06
[52] U.S. Cl. .................................... 14/16.1; 248/181; 52/167
[58] Field of Search ............... 14/16.1; 248/188.3, 248/19, 181; 52/167, 573

[56] References Cited

U.S. PATENT DOCUMENTS

| 592,852 | 11/1897 | Westwood | 14/16.1 |
| 1,829,964 | 11/1931 | Randall | 248/181 X |
| 2,705,928 | 4/1955 | Pont | 52/167 X |
| 3,298,642 | 1/1967 | Taylor | 248/181 |
| 3,311,329 | 3/1967 | Lakitsky | 14/16.1 |
| 3,347,002 | 10/1967 | Penkuhn | 52/167 |
| 3,606,704 | 9/1971 | Denton | 52/167 |
| 3,806,975 | 4/1974 | Fyfe | 14/16.1 |

*Primary Examiner*—Nile C. Byers, Jr.
*Attorney, Agent, or Firm*—George B. Oujevolk

[57] ABSTRACT

A support structure comprising a pair of support units each including a housing and a ball stud having a ball portion placed in the housing and a shank portion formed integrally with the ball portion, the upper support unit having its ball stud shank portion extending downward from the housing fixed to an upper structure such as a bridge girder, the lower support unit having its ball stud shank portion extending upward from the housing fixedly embedded in a lower structure such as a bridge base in the position facing the upper support unit, the upper and lower support units connected to each other at their ball stud portions, and retaining member fixed on a base plate fixed on the lower structure and fitted around the shank portion of the coupled upper and lower support units.

9 Claims, 13 Drawing Figures

SUPPORT STRUCTURE

BACKGROUND OF THE INVENTION

1. Field of the Invention

The invention relates to a support structure comprising a pair of support units each including a housing and a ball stud having a ball portion placed in the housing and a shank portion formed integrally with the ball portion, the upper support unit having its ball stud shank portion extending downward from the housing fixed to an upper structure such as a bridge girder, the lower support unit having its ball stud shank portion extending upward from the housing fixedly embedded in a lower structure such as a bridge base in the position facing the upper support unit, the upper and lower support units connected to each other at their ball stud portions, and a retaining member fixed on a base plate fixed on the lower structure and fitted around the shank portion of the coupled upper and lower support units.

2. Description of the Prior Art

Monorail railways which are generally narrower in girder width as compared with overhead roads and suspension railways are required to have a capacity to bear lifting forces caused by vertical and horizontal loads and tipping moments acting on the girders due to vehicle centrifugal forces and wind loads. Additionally, monorail railways must be so constructed that adjustment of the vertical and horizontal position and the inclination of the griders upon their assembly can be readily made since the girders themselves are used as railways.

Like normal overhead roads, monorail railways are also required to accommodate the expansion and contraction of the girders. For this purpose, it has been proposed to construct specified bridge bases in fixed support fashion so as to provide an inclination and deflection accommodating function and other bridge bases in movable support fashion so as to allow the girders to move axially of the bridge.

In order to satisfy these requirements, various attempts have been made. For example, curved-surface or roller-shaped support members have been interposed between the bridge girder and the bridge base connected to each other by means of anchor bolts. However, such an arrangement is complex in structure, expensive to produce, and difficult to assemble.

OBJECTS OF THE INVENTION

Therefore, it is an object of the present invention to provide a very simple support structure in which the vertical position of the bridge girder can be adjusted by rotation of the ball stud of a support unit fixed to the bridge girder and the inclination of the bridge girder can be adjusted by sliding movement between the ball portion of the ball stud arranged and the support disc fitted in the housing fixed to the upper structure.

Another object of the present invention is to provide a support structure in which the expansion and contraction of the bridge girder after assembly is allowed by sliding movement of the ball portion of the ball stud of the lower support unit fixed through the holding cylinder to the upper structure within an ellipic hole formed in a retaining member.

Yet, another object of the present invention is to provide a support structure in which inclination adjustment upon upper structure attachment is effected by sliding movement of an unfixed outer ring of an retaining member on a base plate within a hole formed in the base plate, during construction.

DETAILED DESCRIPTION OF THE INVENTION

The invenion will be described in more detail with reference to the accompanying drawings. The term "support strucure" as used throughout this invention is intended to include fixed support structures and movable support structures.

The retaining member means the member having a circular hole and an elliptic hole having its apse line directed axially of the bridge through which said holding cylinder is inserted and fixed to said base plate, and also said retaining member is composed of an inner ring having a spherical convex outer surface and an outer ring having a spherical concave surface in sliding contact with the spherical convex outer surface of said inner ring. In the figures, the letter G indicates an upper structure such as a bridge girder, the letter B a lower structure such as a bridge base, and the letter C support units. The numeral 1 designates a sole disc plate fixed through a bottom plate 2 to the upper structure G such as a bridge girder by means of a anchor bolts 3 and formed with a threaded hole 4, and the numeral 5 a retaining member fixed through a base plate 6 fixed to the lower structure B such as a bridge base by means of anchor bolts 7 and formed with a hole 9 larger than the hole 8 in size.

Figure 1:
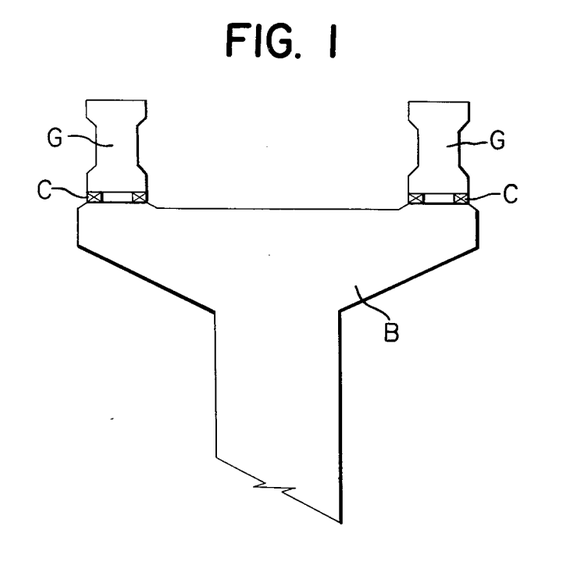
FIG. 1 is an elevational view of a double track monorail railway.
Figure 2:
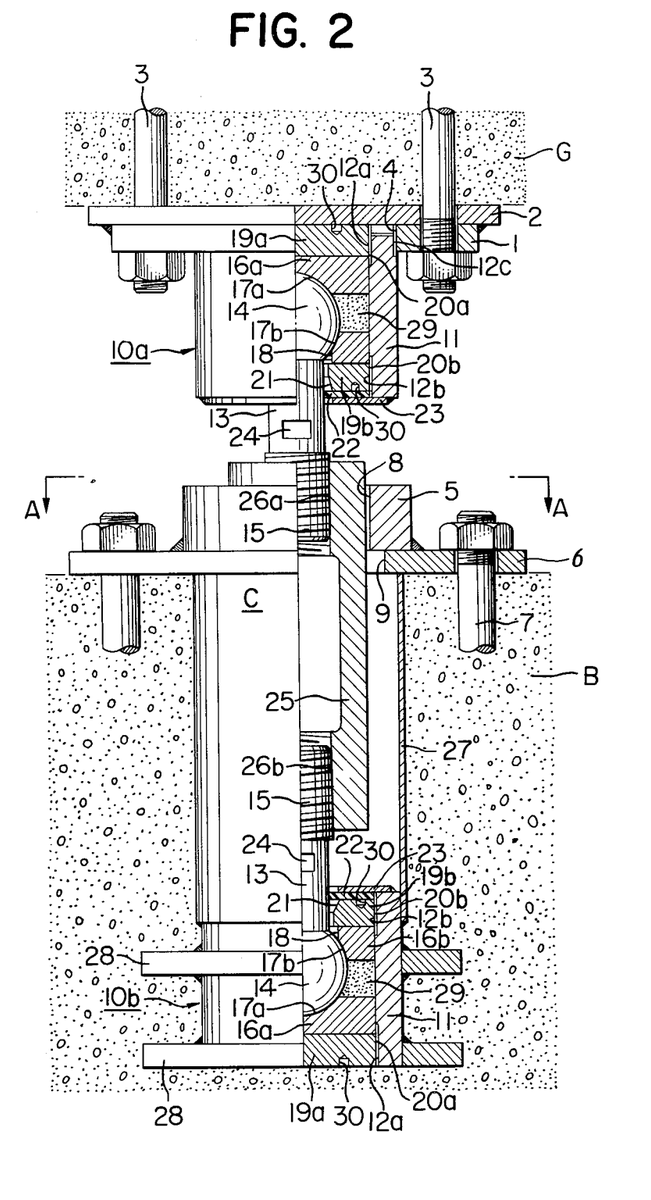
FIG. 2 is a fragmentary elevational view in section showing the support structure of the present invention.
Figure 3:
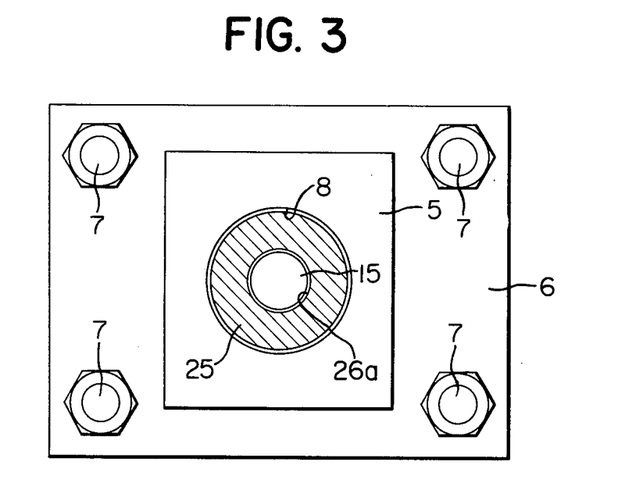
FIG. 3 is a sectional view taken along the line A—A of FIG. 2.
Figure 4:
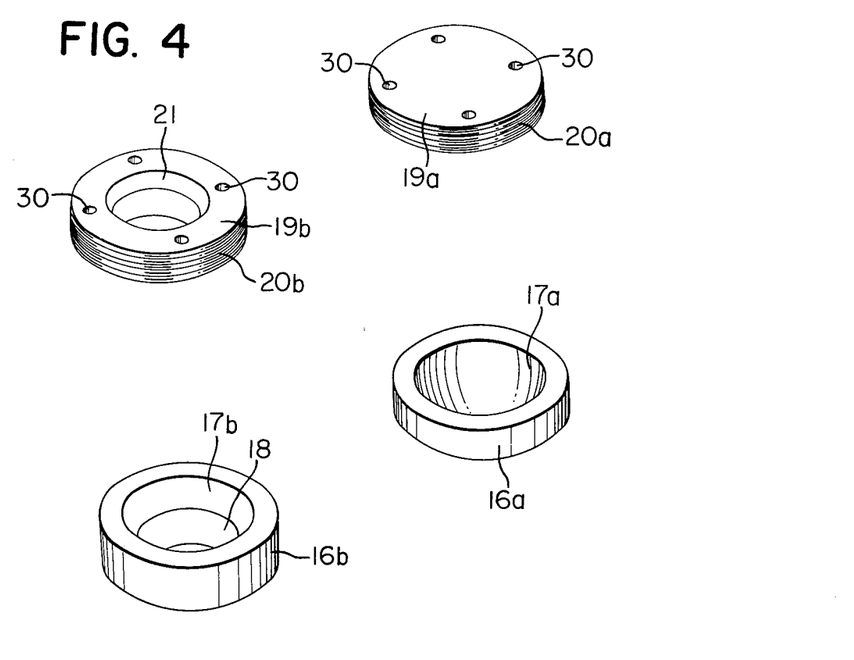
FIG. 4 is a perspective view showing push discs and support discs used in the support structure of the present invention.

The numerals 10a and 10b designates upper and lower support units, the numeral 11 a cylindrical housing having its inner surface formed at its opposite sides with threaded portions 12a and 12b and its outer surface formed at its one end with a threaded portion 12c, the numeral 13 a ball stud having at its one end a ball portion 14 and at the other end a threaded shank portion 15, and the numerals 16a and 16b support discs, the support disc 16a having a spherical concave 17a configurated for entry of the ball portion 14 thereinto and the support disc 16b having a hole 18 with a spherical surface 17b through which the ball stud 13 shank portion 14 extends from the housing 11.

The numerals 19a and 19b indicate push discs formed in their outer peripheral surfaces with respective threaded portions 20a and 20b. The push disc 19b is formed with a tapered hole 21 through which the ball stud shank portion 15 extends from the housing 11 and which serves to accommodate the inclination (deflection) of the bridge girder.

The numeral 22 designates a seal ring for sealing the hole 18 formed in the support disc 16b and the tapered hole 21 formed in the push disc 19b so as to prevent entry of foreign matters, the numeral 23 a retaining plate for retaining the seal ring 22, the numeral 24 a flat cutout portion formed in the shank portion 15 of the ball stud 13, the numeral 25 a holding cylinder having its inner surface formed at its opposite sides with threaded portions 26a and 26b, the numeral 27 a protection cylinder embedded in the substructure B, the numeral 28 anchor frames, the numeral 29 a lubricating anticorrosive charged in the gap defined by the housing 11, the support discs 16a and 16b, and the ball portion 14 of the ball stud 13, and the numeral 30 orifices formed in the push discs 19a and 19b.

The upper and lower structure units 10a and 10b of the support structure of the present invention are assembled in the following manner: The support disc 16a is inserted from one end of the housing 11 and fitted therein with its spherical concave 17a facing the other end of the housing 11. The push disc 19a has its threaded portion 20a threadedly engaged with the threaded portion 12a of the housing 11 so as to be attached in the housing 11 in pressure contact with the support disc 16a. The ball stud 13 with its threaded shank portion 15 extending from the other end of the housing 11 is inserted into the housing 11 and its ball portion 14 is placed into contact with the support disc 16a spherical concave 17a. The support disc 16b is inserted from the other end of the housing 11 and fitted therein with its spherical concave 17a of the support disc 16a placed in contact with the ball portion 14 of the ball stud 13 and the threaded shank portion 15 extending through the hole 18 formed in the support disc 16b. The push disc 19b has its threaded portion 20b threadedly engaged with the threaded portion 12b of the housing 11 so as to be attached in the housing 11 in pressure contact with the support disc 16b with the ball stud 13 extending through the tapered hole 21 formed in the push disc 19b. The seal ring 22 for sealing the hole 18 of the support disc 16b and the tapered hole 21 of the push disc 19b is set to the other end of the housing 11 and is fastened by the retaining plate 23.

The upper and lower support units 10a and 10b assembled as described above have their threaded shank portions 15 threadedly engaged with the threaded positions 26a and 26b formed in the opposite ends of the holding cylinder 25. The threaded portion 12c formed in the outer surface of the housing 11 is threadedly engaged with the threaded hole 4 of the sole plate 1 fixed to the upper structure G. The lower support unit 10b is provided with the protection cylinder 27 and the anchor frames 28 and is embedded in the lower structure B with the holding cylinder 25 loosely fitted in the hole 8 of retaining member 5.

The fixture of the upper and lower support units 10a and 10b to the upper structure G and lower structure B is hereinafter described in detail. One end of the holding cylinder 25 is fitted with the lower support unit 10b provided with anchor frames 28 for providing a solid fixation between the lower support unit 10b and the lower structure B and also the protection cylinder 27 for protecting and allowing within the lower structure B movement of the holding cylinder 25 caused by movement of the upper structure G such as a bridge girder. The lower support unit 10b is embedded in the lower structure B with the other end of the holding cylinder 25 loosely fitted in the hole 8 of the retaining member 5 and slightly extending from the retaining member 5. The retaining member 5 is fixed to the base plate 6 after position adjusted.

Thereafter, the upper support unit 10a is threadedly engaged with the other end of the holding cylinder 25, and then the threaded portion 12c formed in the outer peripheral surface of the housing 11 of the upper support unit 10a is threadedly engaged with the threaded hole 4 of the sole plate 1.

In the above support structure as arranged in accordance with the present invention, the vertical position of the bridge girder is adjusted by rotation of the ball stud 13 of the upper support unit 10a in one direction utilizing the flat cutout portion 24 formed in the shank portion 15 of the ball stud 13. The inclination of the bridge girder is adjusted by sliding movement between the ball portion 14 of the ball stud 13 arranged to the lower structure B and the support discs 16a and 16b fitted in the housing 11 fixed to the upper structure G. Adjustment on the horizontal position of the bridge girder and upon bridge girder attachment is permitted within the hole 9 of the base plate 6 when the retaining member 5 is not fixed to the base plate 6. The retaining member 5 is fixed to the base plate 6 such as by welding after these adjustments. Restriction of movement in the axial direction of the bridge and in the transverse direction of the bridge axis is made by the abutment between the holding cylinder or the ball stud 13 and the hole 18 or 21.

Although the upper support unit 10a is described as fixed to the upper structure G by its threaded engagement with the sole plate 1, it may be inserted under pressure into the sole plate 1 and welded thereto. Also, the base plates 2 and 6 serves to facilitate the solid fixation between the support units and the upper structure G and lower structure B and may be removed if the sole plate 1 and the retaining member 5 are directly fixed to the upper structure G and the lower structure B. It is preferable to provide a seal-member on the upper surface of the hole 8 of the retaining member 5 for the purpose of preventing entry of materials like waste into the protecting cylinder 27.

Figure 5:
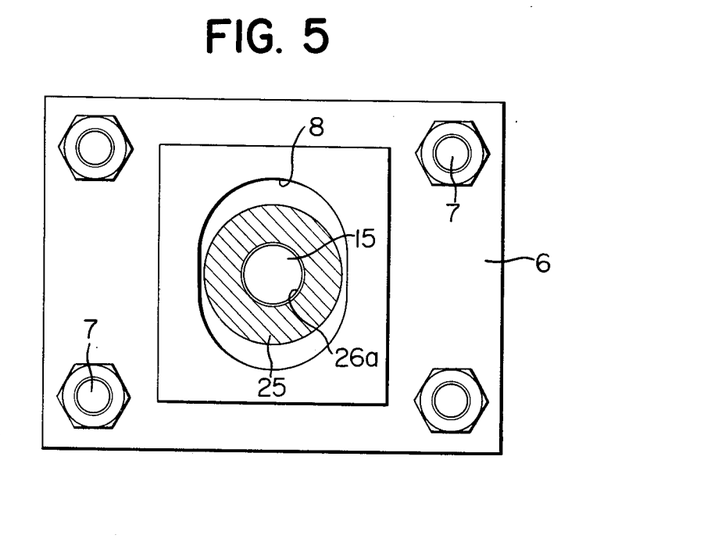
FIG. 5 is a sectional view taken along the line A—A of FIG. 2 showing an alternative embodiment of the present invention in which the guide block is formed with an ellipic hole instead of a circular hole.
Figure 6:
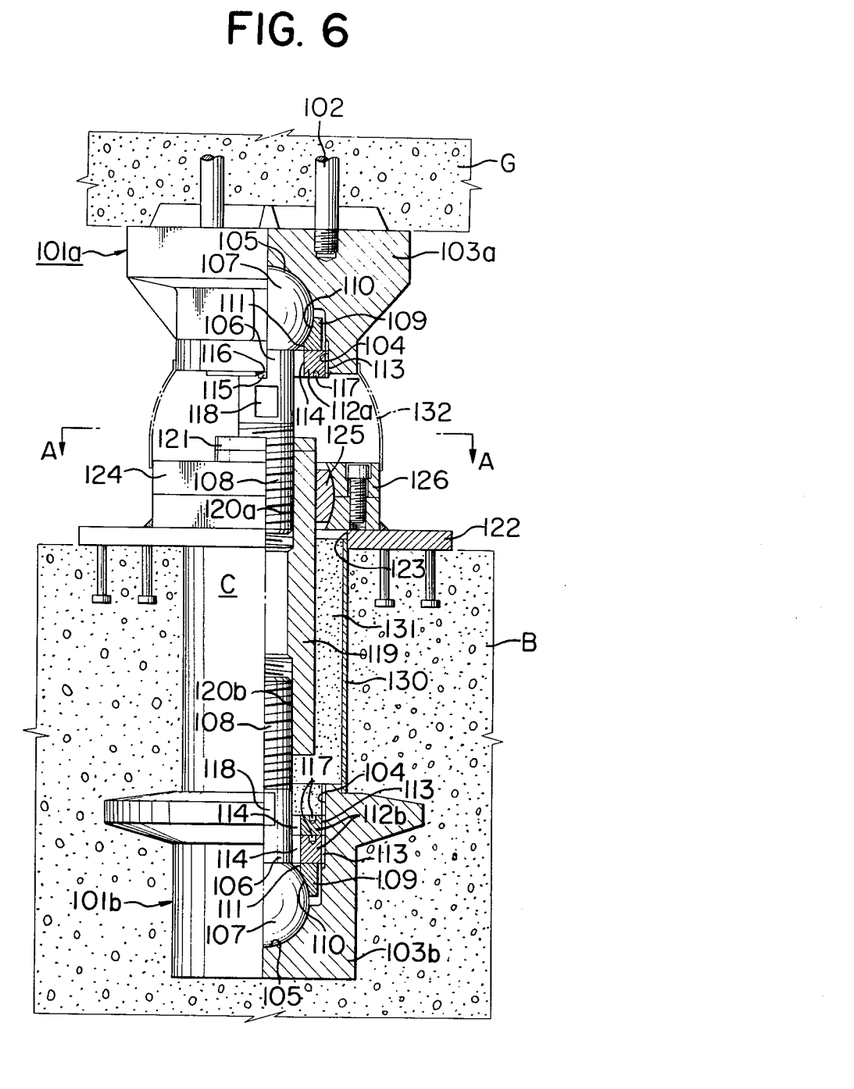
FIG. 6 is a fragmentary elevational view in section showing another embodiment of the support structure of the present invention.
Figure 7:
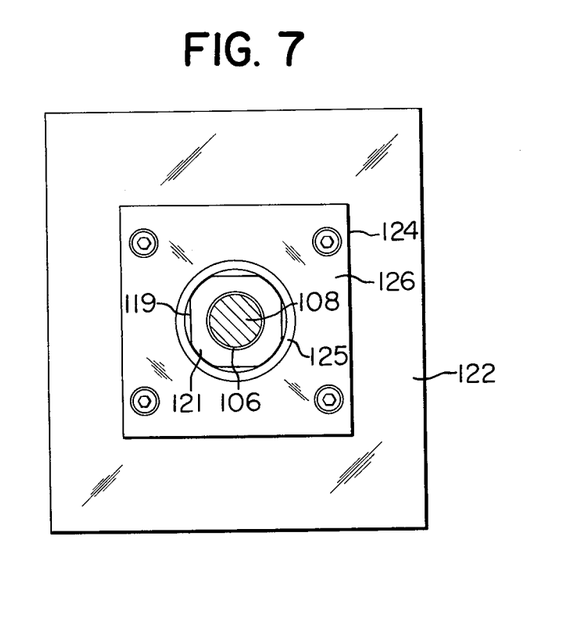
FIG. 7 is a sectional view taken along the line A—A of FIG. 6.
Figure 9:
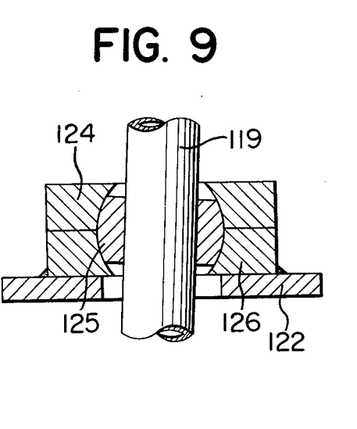

FIG. 5 illustrates an alternative embodiment of the present invention which allows movement of the bridge girder. The retaining member 5 fixed through the base plate 6 to the lower structure B such as a bridge base is formed with an elliptic hole 8 for allowing movement of the bridge girder with its apse line directed axially of the bridge and the base plate 6 is formed with a hole 9 equal or larger than the apse line of the hole 8. Thus, the expansion and contraction of the upper structure G after assembly is allowed by sliding movement between the ball portion 14 of the ball stud of the lower support unit 10b embedded in the lower structure B and coupled through the holding cylinder 25 to the upper structure G and the support discs 16a and 16b fitted in the housing 11 to cause the holding cylinder 25 coupled to the lower support unit 10b to slantly move within the elliptic hole 8 formed in the retaining member 5. A such movement in axial of the bridge and transversal direction to the bridge axis is managed by the abutment between the holding cylinder 25 or the ball stud 13 of the lower support unit 10b and the tapered hole 21 of the push disc 19b. FIGS. 6, 7 and 9 illustrate still another embodiment of the present invention, in which the upper support unit 101a fixed to the structure G has a housing 103a formed in its upper inner wall with a spherical concave 105 and in its opening end with a threaded portion 104.

The vertical position of the bridge girder is adjusted by rotation of the ball stud 106 of the upper support unit 101a in one direction utilizing the flat cutout portion 118 formed in the shank portion 108 of the ball stud 106. The position of the bridge girder is fixed after adjustment by fastening a locking nut 121. Adjustment on the horizontal position of the bridge girder and upon bridge girder attachment is permitted within a hole 123 formed in a base plate 122 by sliding movement of the unfixed outer ring 126 of an aligning member 124 on the base plate 122. After adjusted, the aligning member 124 is fixed to the base plate 122 such as by welding.

Figure 8:
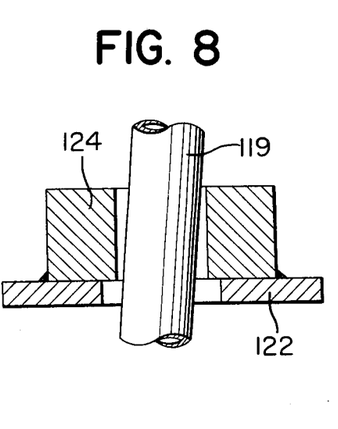
FIGS. 8 and 9 are views used to explain the operation of the guide member and the alignment member.

The function of the aligning member 124 upon attached is described in detail with comparing the arrangement FIG. 9 of the present invention with the fixed support structure FIG. 8 proposed in Japanese Patent Application No. 52-111249.

FIG. 8 arrangement in which a guide member 124 (corresponding to the aligning member of the present invention) is formed with a small gap for entry of the holding cylinder 119 has been found disadvantageous in that the small gap between the holding cylinder 119 and the guide member 124 becomes irregular when the holding cylinder 119 is inclined for position adjustment and if there is any variation in bridge girder inclination under this condition, the holding cylinder 119 and the guide member 124 will abut at a point to cause stress concentration at the point.

The present invention is intended to solve this problem by loosely fitting the holding cylinder 119 in an inner ring 125 of the aligning member 124 fitted in separate outer rings 126 as shown in FIG. 9. That is, since the slant movement of the holding cylinder 119 is effected about the center of the ball portion 107 of the ball stud of the support unit 101b embedded in the substructure B, the slant movement of the holding cylinder 119 will cause variations in the length between the ball center and the base plate 122. However, since the inner ring 125 is loosely fitted around the holding cylinder 119, the variations in the length is absorbed in the slippage caused between the holding cylinder 119 and the inner ring 125 and the alignment member 124 slightly slides on the base plate 122 to accommodate the inclination. Since the holding cylinder 119 can be held in surface contact with the outer ring 126 through the inner ring 125 even if the outer ring 126 of the aligning member is fixed to the base plate 122 under this condition, the undesirable abutment at one point between the holding cylinder 119 and the guide member 124 can be prevented. The use of separated outer rings 126 is for facilitating to assemble the inner ring 125 having spherical convex surfaces in the outer rings.

Although there has been described in this embodiment an arrangement in which the support unit 101a is previously fixed to the upper structure G and then is coupled through the holding cylinder 119 to the support unit 101b fixed to the lower structure B, it is understood that the support unit 101a may be first coupled to the support unit 101b and then fixed to the upper structure G provided with anchor bolts by means of fasteners such as nuts.

FIGS. 10, 11, 12 and 13 illustrates still another embodiment of the present invention. The fixture of the upper and lower support units 101a and 101b to the respective upper structure G and lower structure B is hereinafter described in detail. One end of the holding cylinder 119 is threadedly engaged with the support unit 101b provided with a protection cylinder 130 for protecting and allowing within the lower structure B movement of the holding cylinder 119 caused by movement of the upper structure G. Then, the support unit 101b is embedded in the lower structure B with the other end of the holding cylinder 119 extending through the hole 123 of the base plate 122. Then, the holding cylinder 119 projecting from the base plate 122 is loosely fitted in an inner ring 125 fitted in an aligning member 124. The aligning member 124 is placed on the base plate 122 and a guide member 127 is fitted around the aligning member 124 with gaps 128 axially of the bridge and in sliding contact with the side surfaces to the bridge axis. Thereafter, the upper structure G to which the support unit 101a is fixed through anchor bolts 102 threadedly engaged with the housing 103a of the support unit 101a is disposed above the lower structure B and then the support unit 101a is threadedly fixed to the other end of the holding cylinder 119.

Figure 10:
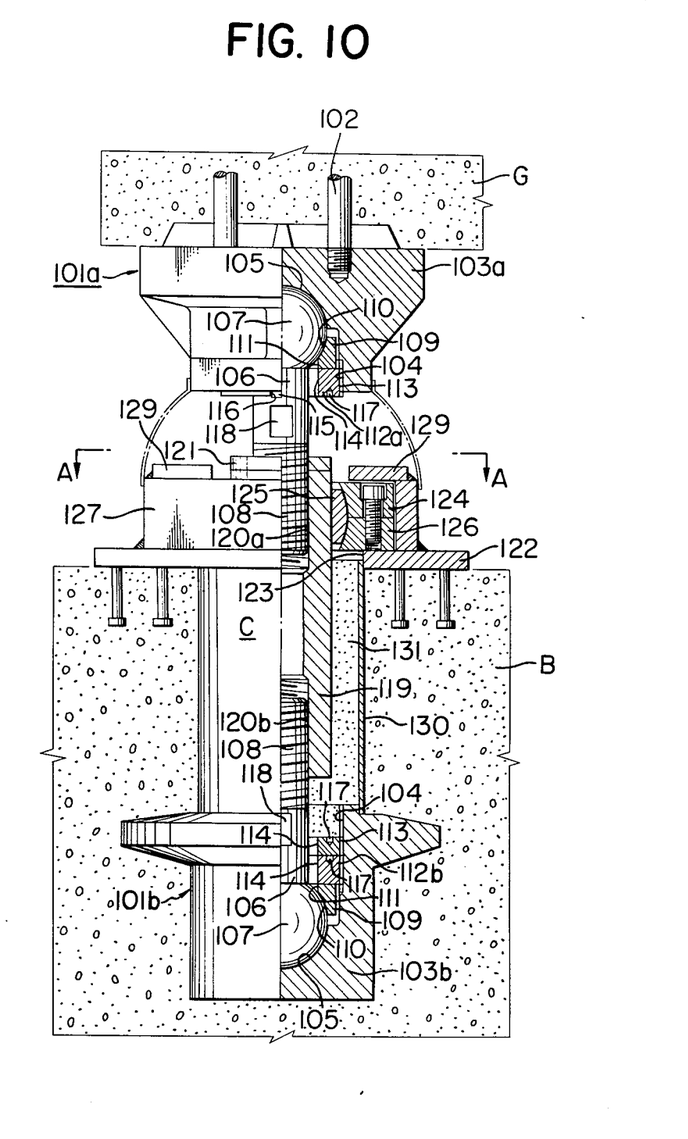
FIGS. 10 and 11 are fragmentary elevational views in section showing still another embodiment of the support structure of the present invention.
Figure 11:
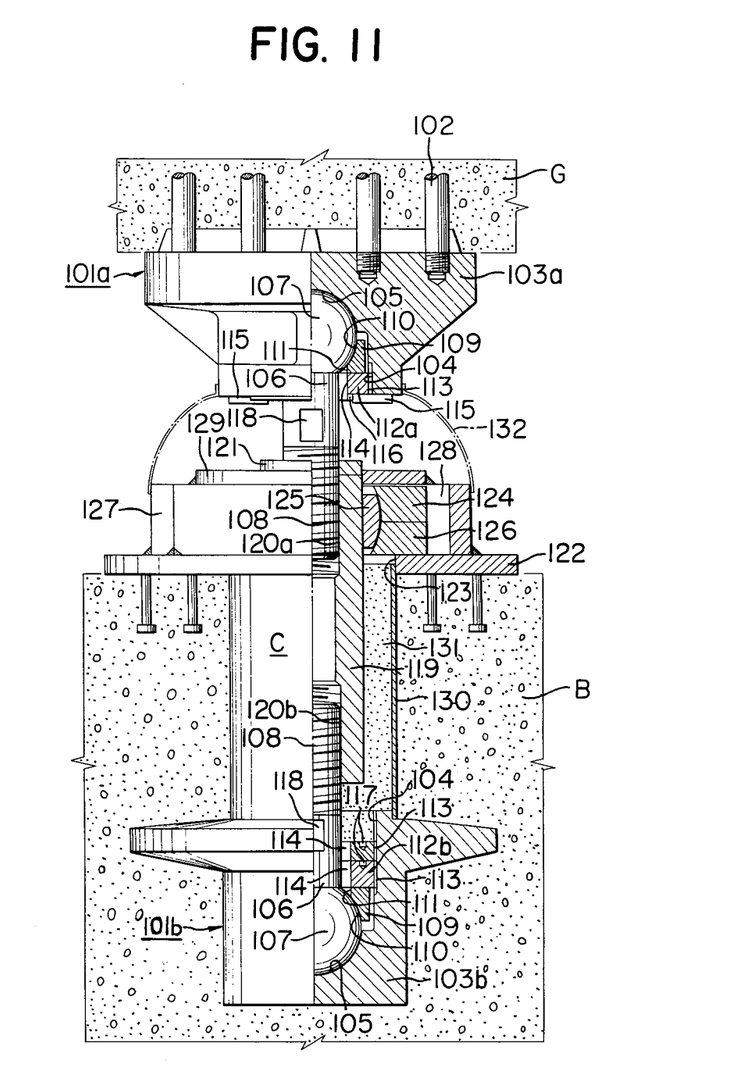

The anticorrosive 131 may be charged into the protecting cylinder 130 from the upper portion after the support unit 101b is embedded in the lower structure B or through a charging pipe (not shown). The retaining member 127 is fixed to the base plate 122 after position adjustment.

Figure 12:
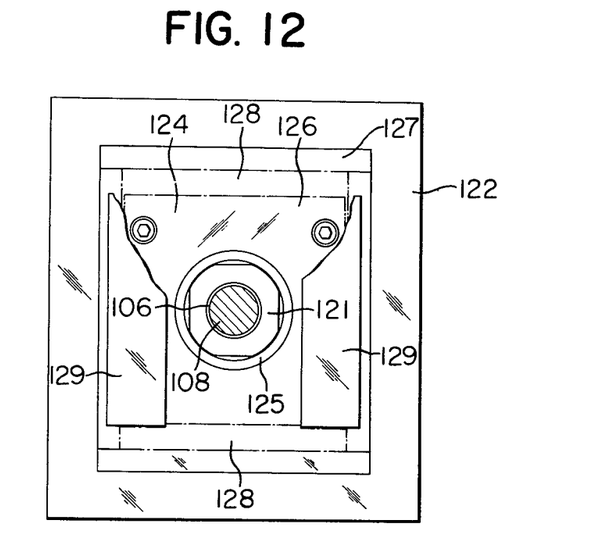
FIG. 12 is a sectional view taken along the line A—A of FIG. 10.
Figure 13:
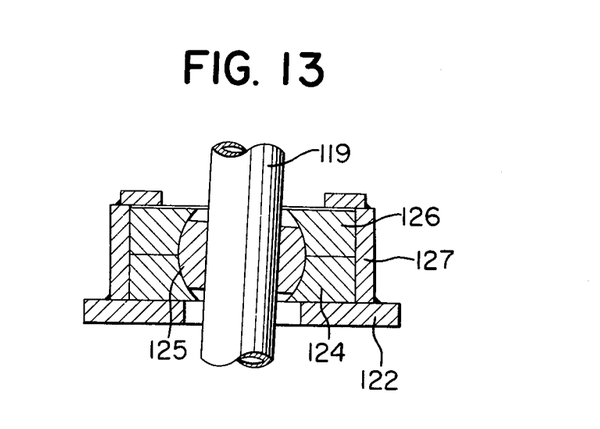
FIG. 13 is a view used to explain the operation of the alignment member.

In this embodiment, the vertical position of the bridge girder is adjusted by rotation of the ball stud 106 of the support unit 101a in one direction utilizing the flat cutout portion 118 formed in the shank portion 108 of the ball stud 106. The position of the bridge girder is fixed after adjustment by fastening a lock nut 121. Adjustment on the horizontal position of the bridge girder and upon bridge girder attachment is permitted within a hole 123 formed in a base plate 122 by sliding movement of the outer ring 126 of the aligning member and the unfixed guide member 127 on the base plate 122. After the adjustment, the retaining member 127 is fixed to the base plate 122 such as by welding. As shown in FIG. 13, the holding cylinder 119 is loosely fitted in the inner ring 125 of the aligning member 124 which is fitted in the divided outer rings 126. The retaining member 127 is fitted around the aligning member 124 with gaps 128 axially of the bridge and insliding contact with the side surfaces normal to the bridge axis. That is, since the slant movement of the holding cylinder 119 is effected about the center of the ball portion 107 of the ball stud of the support unit 101b embedded in the lower structure B, the slant movement of the holding cylinder 119 will cause variations in the length between the ball center and the base plate 122. However, since the inner ring 125 is loosely fitted around the holding cylinder 119, the variations in the length is absorbed in the slippage caused between the holding cylinder 119 and the inner ring 125 and the alignment member 124 slightly slides on the base plate 122 to accommodate the inclination. Since the holding cylinder 119 can be held in surface contact with the outer ring 126 through the inner ring 125 even under this condition, there is no possibility of the abutment at one point between the holding cylinder 119 and the retaining member 127. Also, even if the retaining member 127 is fixed to the base plate 122 under this condition, predetermined gaps 128 axial of the bridge can be held and thus the undesirable abutment at one point can be prevented. The use of divided outer rings 126 is for facilitating to assemble the inner ring 125 having spherical convex surfaces in the outer rings.

The movement (expansion and contraction) of the upper structure G in the direction axial of the bridge can be prevented by slant movement of the holding cylinder 119 about the center of the ball portion 107 of the ball stud of the support unit 101b embedded in the lower structure B, and the movement in axial of the bridge and transversal direction to the bridge axis is managed by the abutment between the aligning member 124 and the retaining member 127.

Although there has been described in this embodiment an arrangement in which the support unit 101a previously fixed to the upper structure G is coupled through the holding cylinder 119 to the support unit 101b fixed to the lower structure B, it is to be understood that the support unit 101a may be coupled to the support unit 101b and then fixed, by means of fasteners such as nuts, to the upper structure G provided with anchor bolts. Instead of the movable support structure arranged to permit the movement axial of the bridge as described in this embodiment, the support structure may be arranged to restrict the movement in axial of the bridge and transversal direction to the bridge axis by provision of stoppers (indicated by the phantom lines) in the gaps between the retaining member 127 and the aligning member 124.

Although a support structure in which the ball studs of the upper and lower support units are threadedly coupled through a separate holding cylinder is illustrated and described in this embodiment, the support structure may be arranged such that one of the ball stud shank portions of the upper and lower support units is formed integrally with a holding cylinder having a female screw threadedly engaged with a male screw formed on the ball stud shank portion of the lower support unit. This arrangement can eliminate the need for producing the holding cylinder separately.

The support structure of the present invention is simple in structure, easy to adjust the vertical and horizontal position of the bridge girder and the inclination of the bridge girder, smooth to transmit the load exerting on the upper structure such as a bridge base, and effective to accommodate lifting forces.

Since the support structure of the present invention is free from any directional property axial of the bridge and normal to the bridge axis upon bridge girder attachment which is found in prior art support structures, it is easy to attach and produce.

What is claimed is:

1. A support structure comprising a pair of upper and lower support units each including a housing and a ball stud having a ball portion placed in said housing and a shank portion formed integrally with said ball portion, said upper support unit having its ball stud shank portion extending downward from said housing fixed to an upper structure such as a bridge girder, said lower support unit having its ball stud shank portion extending upward from said housing fixedly embedded in a lower structure such as a bridge base in the position facing said upper support unit, said upper and lower support units connected to each other by their ball stud portions, and a retaining member fixed on a base plate fixed on said lower structure and fitted around the shank portion of said coupled upper and lower support units.

2. A support structure as set forth in claim 1, wherein said support units each includes a ball stud formed of a ball portion and a shank portion integrally formed with said ball portion, a housing having its inner surface formed at its opposite ends with threaded portions, support discs slidingly supporting said ball portion of said ball stud placed in said housing, and push discs threadedly engaged with said threaded portions of said housing to support said support discs under pressure.

3. A support structure as set forth in claim 1, wherein said support units each includes a ball stud formed of a ball portion and a threaded shank portion integrally formed with said ball portion, a housing having at its one end an opening portion whose inner surface is formed with a threaded portion and having a bottom surface of a spherical concave for slidingly supporting said ball portion of said ball stud, a support disc slidingly supporting said ball portion of said ball stud placed in said housing, and a push disc threadedly engaged with said threaded portion of said housing for supporting said support disc under pressure.

4. A support structure as set forth in claim 1, wherein said upper and lower support units are coupled to each other through a holding cylinder extending through a through-hole formed in a base plate fixed to the lower structure and threadedly engaged at its opposite ends with the threaded portions formed in the shank portions of said ball stud of said support units.

5. A support structure as set forth in claim 1, wherein either said shank portions of said ball studs of said upper and lower support units has a holding cylinder formed integrally therewith and formed with a female screw for threaded engagement with a male screw formed on said shank portion of said ball stud of said upper or lower support unit.

6. A support structure as set forth in claim 4 or 5, wherein said retaining member has a circular hole through which said holding cylinder is inserted and is fixed to said base plate so that movement of said holding cylinder can be managed.

7. A support structure as set forth in claim 4 or 5, wherein said retaining member has an elliptic hole having its apse line directed axially of the bridge through which said holding cylinder is inserted and is fixed to said base plate so that bridge-axial movement of said holding cylinder can be allowed.

8. A support structure as set forth in claim 1, 2, or 3, wherein said retaining member is composed of an inner ring having a spherical convex outer surface and an outer ring having a spherical concave surface in sliding contact with the spherical convex outer surface of said inner ring, said inner ring inserted around the outer peripheral surface of said holding cylinder, and said outer ring fixed to said base plate thereby aligning said holding cylinder, upon setting, to manage movement of said holding cylinder.

9. A support structure as set forth in claim 1, 4, or 5, wherein said retaining member is composed of an inner ring having a spherical convex outer surface, an outer ring having a spherical concave surface in sliding contact with the spherical convex outer surface of said inner ring, and a retaining member having its side-surfaces in the direction of the bridge axis in sliding contact with the outer peripheral surface of said outer ring and its side surfaces spaced apart from the outer peripheral surface of said outer ring in the direction of the bridge axis, and said inner ring inserted into around the outer peripherical surface of said holding cylinder, and said retaining member fixed to said base plate thereby aligning said holding cylinder, upon setting, to manage bridge-axial movement of said holding cylinder.

* * * * *